United States Patent [19]
Lee et al.

[11] 4,204,970
[45] May 27, 1980

[54] LUBRICANT COMPOSITIONS CONTAINING ALKYLATED AROMATIC AMINO ACID ANTIOXIDANTS

[75] Inventors: Richard J. Lee, Downers Grove; Samuel W. Harris, Naperville, both of Ill.

[73] Assignee: Standard Oil Company (Indiana), Chicago, Ill.

[21] Appl. No.: 967,295

[22] Filed: Dec. 7, 1978

[51] Int. Cl.$^2$ ............................................. C10M 1/32
[52] U.S. Cl. ............................. 252/51.5 A; 252/403; 260/326.5 F; 562/433; 562/437; 562/456; 562/457
[58] Field of Search .................... 252/51.5 A, 403; 562/433, 437, 456, 457; 260/326.5 F

[56]  References Cited
U.S. PATENT DOCUMENTS

| 3,123,634 | 3/1964 | Udelhofen | 252/51.5 A X |
| 3,183,069 | 5/1965 | Udelhofen | 252/51.5 A X |
| 3,270,023 | 8/1966 | Shay et al. | 252/51.5 A X |
| 3,507,880 | 4/1970 | Altwicker | 562/433 X |
| 3,585,137 | 6/1971 | Bosniack et al. | 252/51.5 A X |
| 3,642,632 | 2/1972 | Coburn | 252/51.5 A |
| 3,873,459 | 3/1975 | Pawlak et al. | 252/51.5 A |
| 3,993,679 | 11/1976 | Hall et al. | 562/437 X |

FOREIGN PATENT DOCUMENTS 1380065  1/1975  United Kingdom ..................... 562/433

Primary Examiner—Andrew Metz
Attorney, Agent, or Firm—William H. Magidson; Arthur G. Gilkes; William T. McClain

[57] ABSTRACT

Lubricant compositions containing polymer alkylated aromatic amino acids as antioxidants and a process for the preparation of these amino acids comprising hydrolysis of cyclic keto amides formed from an intramolecular acylation of an imide of an aromatic amine.

10 Claims, No Drawings

LUBRICANT COMPOSITIONS CONTAINING ALKYLATED AROMATIC AMINO ACID ANTIOXIDANTS

This invention relates to hydrocarbon lubricating oils having improved oxidation inhibiting properties. More particularly this invention relates to lubricating oil compositions containing polymer alkylated aromatic amino acids effective as antioxidants and to a process for the preparation of these amino acids by hydrolysis of cyclic keto amides formed from an intramolecular acylation of an imide of an aromatic amine.

It is known that under conditions of use lubricating oils come into contact with oxygen at elevated temperatures in the presence of metals or other compounds that act as oxidation catalysts with the result that the lubricant undergoes a series of oxidation reactions causing an increase in the viscosity of the lubricant and the formation of acidic contaminants within the oil which can be corrosive to engine components. Typical additives acting as oxidation inhibitors commonly incorporated into hydrocarbon oils include oil soluble compounds such as phenols, hindered phenols, amines, imines, triazines, cyanurates, sulfurized organic compounds such as aromatic or aliphatic sulfides, sulfones, sulfoxides, thioethers, thioesters, and phosphorus containing organic compounds such as phosphate esters, phosphites, phosphinates, and phosphonates. Amino acids are not usually employed as antioxidants in lubricants. Several of the commonly used compounds while, effective oxidation inhibitors, can be expensive to produce. In addition it is preferred that the sulfur content of the oil be maintained as low as possible. Also some antioxidants are not efficient in preventing increases in lubricant viscosity. A continuing need exists for improved lubricant compositions containing antioxidants effective at elevated temperatures at low concentrations that can be economically produced.

Several traditional methods are known for the preparation of amino acids. These include hydrolysis of proteins, alpha-halogen acid synthesis, modification of the Gabriel synthesis, Strecker cyanohydrin synthesis, modification of the malonic ester synthesis, hydrolysis of hydantoin, and others. Aromatic rearrangement reactions involving heteroatoms have also been thoroughly studied. For example, the Orton reaction involves the migration of a halogen atom to the ortho position of a parent acetanilide compound. The benzidine rearrangement illustrates that in an acid medium N—N or N—C bonds will dissociate and migrate to the ortho positions of the compound. Cyclic ketones can be prepared by an intramolecular Friedel-Crafts acylation involving an aromatic ring with an acyl halide group in the attached side chain. Although one might speculate that imides of aromatic amines could rearrange intramolecularly to generate cyclic keto amides, this type of intramolecular rearrangement reaction has not been disclosed.

It is the object of this invention to provide lubricant compositions which are resistant to oxidative deterioration. Another object is to provide lubricant compositions containing polymer alkylated aromatic amino acids effective as oxidation inhibitors. A further object is to provide a new class of amino acids with antioxidant properties. A further object is to provide a process for the production of these amino acid compounds. Other objects appear hereinafter.

We have found that these objects can be attained by producing new lubricant compositions comprising a major amount of a hydrocarbon oil containing a small percentage of a polymer alkylated aromatic amino acid. It is possible to produce this new class of amino acids by hydrolysis of cyclic keto amides formed from an intramolecular acylation of imides of aromatic amines. These amino acids are effective antioxidants in lubricating oils and aid in the prevention of increases in oil viscosity under conditions of use.

The lubricant compositions of the present invention comprise a major amount of a hydrocarbon oil containing from about 0.1% to 10% of a polymer substituted aromatic amino acid having the following structure:

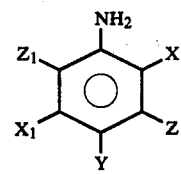

wherein X is

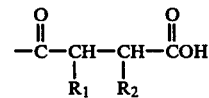

one $R_1$ or $R_2$ is hydrogen and the other is a residue of an olefin polymer; $X_1$ is selected from the group consisting of X and hydrogen; when $X_1$ is X, Y is $NH_2$; and when $X_1$ is hydrogen, Y is hydrogen, alkyl, aryl, halogen, nitro, amino (including N and NN' substituted amino), or

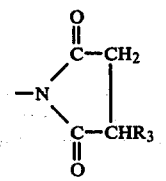

and $R_3$ is an olefin polymer residue; Z and $Z_1$ are selected separately from the group consisting of hydrogen, alkyl, halogen, nitro, amino, (including N and NN' substituted amino), and fused benzene. Thus amino acids derived from naphthalene, anthracene, and phenanthrene are included in the present invention.

The hydrocarbon oil component can be any synthetic or natural hydrocarbon oil such as petroleum oil preferably with a viscosity of about 40 to 110 Saybolt Universal Seconds at 100° C. The present invention is particularly adopted to oils for diesel, gasoline, and other types of spark ignition engines. Therefore fully formulated oils that pass the current MS Test Sequences are preferred.

The polymer substituted aromatic amino acid can be prepared by a three step process as follows:

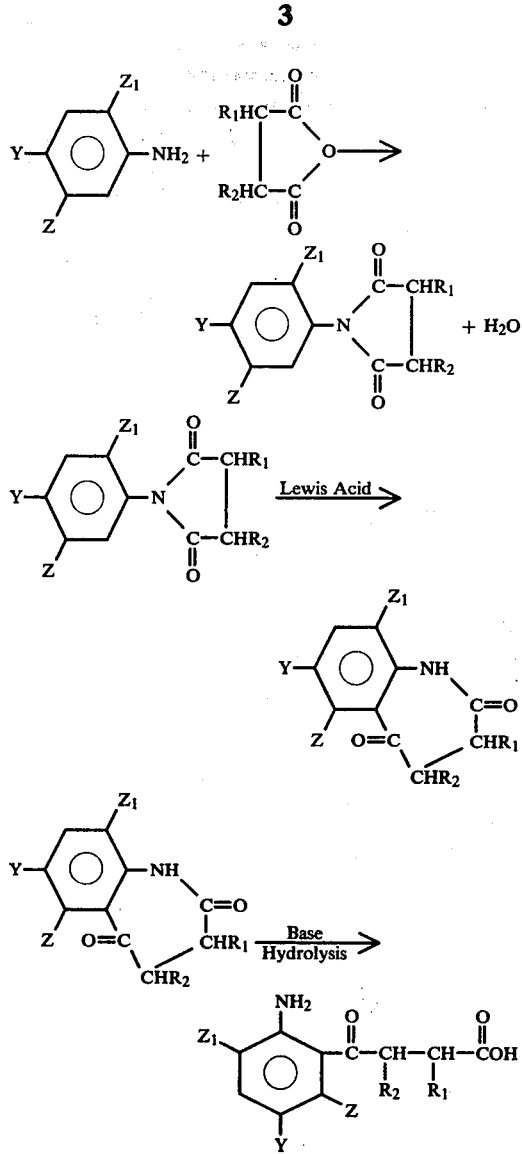

A primary aromatic amine is reacted with an anhydride with an aliphatic chain in the alpha or beta position to generate an imide, the imide is transformed into a cyclic keto amide by means of an intramolecular acylation in the presence of a Lewis acid, and the cyclic keto amide is hydrolyzed to generate the amino acid. Use of this aromatic rearrangement process results in the aliphatic substituent on the anhydride reactant remaining intact as the amino acid generated.

Anhydrides suitable for use as reactants are anhydrides of an alpha, beta dicarboxylic acid with an aliphatic chain in the alpha or beta position. Preferred are polyolefin substituted succinic anhydrides which can be prepared by the reaction of maleic anhydride with a polyolefin as disclosed in U.S. Pat. Nos. 3,306,907 and 3,714,045, as well as by other methods. Appropriate polyolefins include the polymers of $C_2$-$C_{20}$ alpha-mono-olefins such as polymers of ethylene, propylene, butene, hexene, and similar homologs. Preferred are succinic anhydrides with a polybutene substituent of $\overline{M}n$ of about 200 to about 500.

Amines suitable for use in the process of the present invention are aromatic amines with at least one primary amino group with an adjacent unsubstituted ring position. Examples include aniline; toluidine; p-amino styrene; 4-amino-biphenyl; p-chloroaniline; p-nitroaniline; phenylenediamine; 4-amino-N-methylaniline; 4-amino-N-methyl-N-ethylaniline; 3-ethylaniline; 6-methylaniline; 3,4-dimethylaniline; 3,6-diethylaniline; 3,4,6-triethylaniline; 3-ethyl-6-propyltoluidine; 3-chloroaniline; 6-chloroaniline; 3,4 dichloroaniline; 3,6-dichloroaniline; 3,4,6-trichloroaniline; 3-nitroaniline; 6-nitroaniline; 3,6-dinitroaniline; 3,4,6-trinitroaniline; 1,3,4 triaminobenzene; 3-chlorotoluidine; 6-nitrotoluidine; naphthylamine; amino-anthracene; amino-phenanthrene; and other similar amines. Succinimides generated include N-phenyl-succinimide; para-methyl-succinimido benzene; 3,4-dimethyl-succinimido-benzene; 3,4,6-trichloro-succinimido benzene; 3,4-dinitro-succinimido benzene; paradisuccinimido benzene; and others. Aniline and paraphenylenediamine are the preferred amine reactants.

Suitable solvents for the formation of the imide and the subsequent rearrangement reaction include inert aromatic hydrocarbons such as benzene, toluene, ethylbenzene, propylbenzene, and similar compounds. Benzene is preferred to the others.

A Lewis acid is used to catalyze the rearrangement reaction of the aromatic succinimide. A strong Lewis acid of the type commonly used in Friedel-Crafts intramolecular acylations is needed such as aluminum chloride, stannic chloride, zinc chloride, borontrifluoride, or borontrifluoride-hydrofluoric acid complex. Aluminum chloride is preferred for the rearrangement reaction of the present invention.

The final hydrolysis reaction to generate the desired amino acid is effected by means of a strong base. Suitable basic compounds include alkali metal hydroxides such as sodium hydroxide, potassium hydroxide, and lithium hydroxide, or quaternary ammonium hydroxides such as tetramethyl ammonium hydroxide, trimethyl-n-propyl ammonium hydroxide, and similar compounds. The base is used in the form of either an aqueous or alcoholic solution. Choice of an aqueous or alcoholic solvent is dependent upon the solubility characteristics of the substituent on the original succinic anhydride reactant since this substituent remains intact throughout the reaction. Typical alcoholic solvents include methanol, ethanol, and like compounds. Use of a small volume of strongly basic concentrations such as 10%–30% aqueous or alcoholic solutions typical of conventional hydrolysis reactions is preferred.

In somewhat greater detail the polymer alkylated aromatic amino acids are generated by hydrolysis of cyclic keto amides formed from an intramolecular acylation of imides of aromatic amines. An aromatic amine is first placed with a polymer substituted succinic anhydride in a solvent such as benzene with heating to generate an aromatic succinimide. Water is removed from the reaction mixture and a Lewis acid such as aluminum chloride is added to effect a rearrangement reaction wherein the imide linkage is destroyed and an intramolecular acylation of the aromatic ring occurs to generate a cyclic keto amide. This reaction is conducted under reflux conditions at 20° C. to 150° C. dependent upon the solvent employed. The cyclic keto amide is then hydrolyzed by means of a strong base which destroys the amide linkage to yield a polymer substituted aromatic amino acid. Separation of the desired amino acid is effected by adding hydrochloric acid to precipitate out alkali salts and to stabilize the zwitter ion form of the amino acid.

To effect the reaction process for generating the amino acid, an aromatic amine is contacted with a substituted succinic anhydride at a molar ratio of 1:1 to 3:1 in an inert solvent such as benzene in a conventional glass reactor. It is preferred to have a 1:1 molar ratio of amino group to anhydride. Upon heating it is known that the corresponding succinimide is generated. This reaction can be conducted at temperatures of 20°–150° C. at atmospheric pressure. Water generated by the reaction can be removed by azeotropic distillation and any solvent distilled out replaced.

The rearrangement reaction can then be initiated by the addition of a Lewis acid, preferably aluminum chloride. The succinimide in the presence of the Lewis acid undergoes an intramolecular acylation of the aromatic ring to form a cyclic keto amide. A molar ratio of 1:4 to 1:7 Lewis acid to imide group is preferred. The aluminum chloride can be added to the reaction mixture at room temperature in a catalytic amount with continuous stirring. Introduction of the catalyst at higher temperatures promotes side reactions with contaminants normally present in the oil solvent used for the succinic anhydride reactant. This reaction is usually conducted with continuous stirring.

The rearrangement reaction can be carried out at temperatures of 20°–150° C. Preferably the reaction is conducted at the refluxing temperature of the solvent employed, which when using benzene is about 80° C. Use of lower temperatures results in a reduced reaction rate and longer reaction time while higher temperatures can promote side reactions. The aluminum chloride will decompose the product at temperatures greater than 150° C. At refluxing temperatures the reaction can be conducted at atmospheric pressure.

The progress of the rearrangement reaction can be monitored by performing infrared analysis on samples periodically taken from the reaction mixture to confirm the disappearance of the imide group. When no imide remains the rearrangement reaction is terminated by introducing ammonia gas into the reaction mixture. The gas reacts to deactivate the catalyst and precipitate aluminum salts which can be separated by filtration or other equivalent means of separating solids from liquids. The solvent and any contaminants present, such as side reaction products, are removed by sparging the reaction mixture with nitrogen. The resulting product constitutes a polymer alkylated cyclic keto amide.

The cyclic keto amide can then be hydrolyzed by means of a strong base to generate the desired polymer alkylated aromatic amino acid. A conventional base hydrolysis can be employed wherein a small volume of a 20%–30% aqueous or alcoholic base such as potassium hydroxide is added with stirring to the amide in a conventional glass reactor. Molar ratios of 1:1 to 1:5 base to amide group can be employed with a ratio of 1:2 to 1:3 preferred. The reaction mixture is heated to refluxing temperatures to effect the hydrolysis. The hydrolysis reaction can be carried out at approximately 100° C. for 16 to 24 hours. After cooling to room temperature hydrochloric acid can be added to neutralize the reaction mixture and precipitate by-product salts which can then be separated by filtration. The acid can also serve to stabilize the amino acid zwitter ion to prevent the occurrence of the reverse reaction in significant amounts.

Quantitative yields of up to 100% polymer alkylated amino acid can be attained by this process. Any imide remaining present after the rearrangement reaction will hydrolyze less readily than the corresponding cyclic keto amide and will therefore result in a mixture in the final product. It is likewise possible that only one imide group of a disuccinimido benzene will cyclize to the amide yielding an imido keto amide which will hydrolyze to an imido amino acid. These will result in less than 100% conversion but can be avoided by careful monitoring of the rearrangement reaction. The polymer substituent on the succinic anhydride reactant remains intact as the amino acid generated. This in combination with the fact that the amino group is attached to an aromatic ring makes these amino acids less polar than naturally occurring amino acids and accounts for their effectiveness in preventing viscosity increases in lubricants.

EXAMPLE 1

One mole of polybutyl succinic anhydride of $\overline{Mn}$ 420 comprising 65% of an oil solution (645 g of solution) and one mole (93 g) of aniline in 200 cc of benzene were reacted with heating at about 80° C. under reflux conditions in a conventional glass reactor equipped with stirring apparatus and condensors to generate N-phenyl polybutyl succinimide. Water from the reaction was removed by azeotropic distillation and benzene solvent replaced. The reaction mixture was cooled to room temperature and 30 g of aluminum chloride were added with stirring. The reaction mixture was heated to reflux at about 80° C. and held for two hours. A sample of the reaction mixture was analyzed by infrared spectroscopy to confirm absence of the imide group and presence of the keto group. The reaction was then terminated by bubbling ammonia gas into the reaction mixture to deactivate the aluminum chloride catalyst and to precipitate aluminum salts. The salts were removed by filtration. Benzene was removed by sparging with nitrogen gas to separate the cyclic keto amide generated. This product was identified by infrared spectroscopy and the rearrangement reaction appeared quantitative since no imide was found present. The cyclic keto amide generated was then dissolved in 100 cc of a 20% aqueous solution of potassium hydroxide in a glass reactor equipped as above. The reaction mixture was heated to a reflux temperature of about 100° C. and refluxing was continued for about 16 hours. Upon cooling hydrochloric acid was added to neutralize the solution and precipitate salt byproducts. The desired polymer alkylated aromatic amino acid was then obtained by removing the precipitated salts by filtration.

This example illustrates the production of polybutyl beta-anthronoyl propionic acid by hydrolysis of a cyclic keto amide generated by an intramolecular acylation rearrangement of polybutylsuccinimide. The anthronoyl group is substituted in the beta position of the amino acid. The polymer group can be in either the alpha or beta positions of the acid.

EXAMPLE 2

This example illustrates the production of 1,4-diamino 2,5-di(gamma-oxo polybutyl butyric acid) benzene by the method of Example 1. The butyric acid substituents are attached to the benzene ring at the gamma position of the acid. The polybutyl can be in the alpha or beta position on both butyric acid substituents or can be in the alpha position on one acid substituent and the beta position on the other.

One mole of polybutyl succinic anhydride of Mn 420 comprising 65% of an oil solution (645 g of solution) and one half mole of paraphenylenediamine in 200 cc of benzene were reacted with heating at about 80° C. under reflux conditions in a conventional glass reactor equipped as in Example 1 to generate para-disuccinimido benzene. Water from the reaction was removed by azeotropic distillation and benzene solvent replaced. The reaction mixture was cooled to room temperature, 20 g of aluminum chloride added, and the mixture stirred at room temperature for two days. The reaction mixture was then heated to reflux at about 80° C. and held for two hours. Monitoring of the reaction by infrared spectroscopy, termination of the reaction by the addition of ammonia, and separation of the aluminum salts, solvent, and cyclic keto amide were as in Example 1. Hydrolysis of the amide with a 20% alcoholic potassium hydroxide solution for 24 hours was performed as in Example 1 to generate the desired amino acid.

OXIDATION TESTS

The compounds of the present invention were subjected to a series of tests to evaluate their anti-oxidant utility in lubricating oils. Tests were made by a bench technique in which air was passed through the oil maintained at 175° C. and the time required for the oil to double in viscosity was measured. Also a Ford 289 Engine test was conducted. This test was comparable to an MS Sequence III Test. The engine was operated to emphasize oxidative thickening and the viscosities at 24 hours were compared to the initial viscosities. The oils tested were fully formulated 10W-30 oils which passed the MS sequence tests containing 1.0% of the additive compound. Test results are summarized in Table I.

Table I

| Bench Test | |
| --- | --- |
| Oil Composition | Hours to Double Initial Viscosity |
| Base Oil | 48 |
| Base Oil + 1% Product of Ex. 1 | 50 |
| Base oil + 1% Product of Ex. 2 | 58 |

| Engine Test (Ford (289)) | |
| --- | --- |
| Oil Composition | Viscosity at 24 Hours ÷ Viscosity Initial |
| Base Oil | 36 |
| Base Oil + 1% Product of Ex. 2 | 4 |

From the above data it is concluded that the additives are useful in applications where severe operating conditions lead to oxidative thickening of oils in gasoline or diesel engines.

We claim:
1. A lubricant composition resistant to oxidative deterioration comprising a major proportion of hydrocarbon oil and about 0.1% to 10% of an amino acid having the structure:

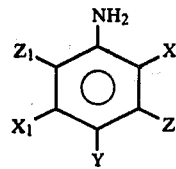

wherein X has the structure

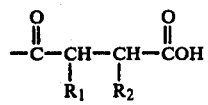

one of $R_1$ and $R_2$ is hydrogen and the other is a residue of an olefin polymer; $X_1$ is selected from the group consisting of X and hydrogen; when $X_1$ is X, Y is $NH_2$; when $X_1$ is hydrogen, Y is selected from the group consisting of hydrogen, alkyl, aryl, halogen, nitro, amino, and

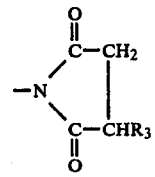

and $R_3$ is an olefin polymer residue; Z and $Z_1$ are separately selected from the group consisting of hydrogen, alkyl, halogen, nitro, amino, and fused benzene.

2. The composition of claim 1 wherein one of $R_1$ and $R_2$, and $R_3$ if present, are the residues of a butene polymer having an $\overline{M}n$ of about 200 to 500.

3. A process for the production of an alkylated aromatic amino acid which comprises
   (a) reacting an aromatic amine with an anhydride of an alpha, beta dicarboxylic acid with an aliphatic chain in the alpha or beta position to generate a substituted imide
   (b) intramolecularly acylating the imide of step (a) by a Lewis acid catalyst to generate a substituted cyclic keto amide
   (c) hydrolyzing the cyclic keto amide of step (b) in base to generate the substituted aromatic amino acid.

4. The process of claim 4 wherein the anhydride is succinic anhydride with a polybutene substituent of $\overline{M}n$ of about 200 to 500.

5. The process of claim 4 wherein the aromatic amine is para-phenylenediamine.

6. The process of claim 4 wherein the Lewis acid catalyst is aluminum chloride.

7. The process of claim 4 wherein the reactions are conducted at 20° C. to 150° C.

8. The process of claim 4 wherein the molar ratio of anhydride to aromatic amine varies from about 1:1 to 3:1.

9. The process of claim 4 wherein polybutyl succinic anhydride is reacted with para-phenylenediamine to generate para-disuccinimido benzene, which is further reacted to produce 1,4-diamino, 2,5-di(gamma-oxo, polybutyl butyric acid) benzene wherein the polybutyl is in either the alpha or beta position on the acid substituents.

10. An amino acid having the structure

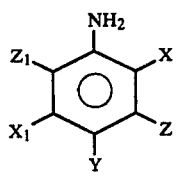

wherein X has the structure

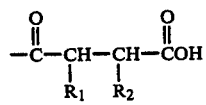

one of $R_1$ and $R_2$ is hydrogen and the other is a residue of an olefin polymer; $X_1$ is selected from the group consisting of X and hydrogen; when $X_1$ is X, Y is $NH_2$; when $X_1$ is hydrogen, Y is selected from the group consisting of hydrogen, alkyl, aryl, halogen, nitro, amino, and

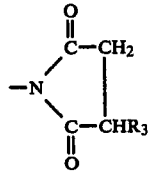

and $R_3$ is an olefin polymer residue; Z and $Z_1$ are separately selected from the group consisting of hydrogen, alkyl, halogen, nitro, amino, and fused benzene.

* * * * *